(12) United States Patent
Palkisto et al.

(10) Patent No.: US 7,471,957 B2
(45) Date of Patent: Dec. 30, 2008

(54) PAGING METHOD AND SYSTEM FOR A RADIO ACCESS NETWORK

(75) Inventors: Virpi Palkisto, Espoo (FI); Jukka Vialen, Espoo (FI)

(73) Assignee: Nokia Corporation, Espoo (FI)

( * ) Notice: Subject to any disclaimer, the term of this patent is extended or adjusted under 35 U.S.C. 154(b) by 657 days.

(21) Appl. No.: 10/470,945

(22) PCT Filed: Feb. 4, 2002

(86) PCT No.: PCT/IB02/00337

§ 371 (c)(1),
(2), (4) Date: Aug. 5, 2003

(87) PCT Pub. No.: WO02/063912

PCT Pub. Date: Aug. 15, 2002

(65) Prior Publication Data

US 2004/0102200 A1 May 27, 2004

(30) Foreign Application Priority Data

Feb. 5, 2001 (DE) ................................ 101 05 093

(51) Int. Cl.
*H04Q 7/20* (2006.01)

(52) U.S. Cl. .................... 455/458; 455/561; 455/550.1; 370/338; 370/328

(58) Field of Classification Search ................. 455/466, 455/414, 560, 445, 456.1, 422.1, 458, 561, 455/550.1; 370/329, 338, 328
See application file for complete search history.

(56) References Cited

U.S. PATENT DOCUMENTS

| 5,561,701 | A | * | 10/1996 | Ichikawa | 340/7.26 |
| 5,854,979 | A | * | 12/1998 | Iwajima | 455/426.1 |
| 6,157,815 | A | * | 12/2000 | Collins et al. | 340/7.32 |
| 6,301,230 | B1 | * | 10/2001 | Ito et al. | 370/313 |
| 7,143,187 | B1 | * | 11/2006 | Takeda et al. | 709/245 |
| 2002/0001291 | A1 | * | 1/2002 | Willars et al. | 370/329 |
| 2002/0105969 | A1 | * | 8/2002 | Benedyk et al. | 370/466 |
| 2005/0101245 | A1 | * | 5/2005 | Ahmavaara | 455/1 |

FOREIGN PATENT DOCUMENTS

| WO | WO 99/57935 | 11/1999 |
| WO | WO 00/21318 | 4/2000 |
| WO | WO 00/33599 | 6/2000 |

* cited by examiner

*Primary Examiner*—Danh C Le
(74) *Attorney, Agent, or Firm*—Squire, Sanders & Dempsey, L.L.P.

(57) ABSTRACT

The present invention relates to a paging method and system for a radio access network which provides access to a core network, said system comprising a central network controlling device (100) for receiving pagings and for distributing said pagings to other network controlling devices (5) based on a paging information provided to said central network controlling device. Accordingly, while the access network comprises many RNCs and/or RNASs, the information required for paging or mobility management is provided at one place in one location or routing area. Thus, when the core network sends a paging request, the request does not have to be transmitted to many RNCs and/or RNASs and extra paging can be avoided in the access networks. Moreover, a paging coordination is possible despite of the number of different core networks.

29 Claims, 6 Drawing Sheets

PAGING METHOD AND SYSTEM FOR A RADIO ACCESS NETWORK

PRIORITY

This application is a 371 of PCT/IB02/00337 filed on Feb. 4, 2002 and claims priority from Germany application 101 05 093.3 filed on Feb. 2, 2001, the content of which is hereby incorporated by reference into this application.

FIELD OF THE INVENTION

The present invention relates to a method and system for providing a paging function in a RAN (radio access network), e.g. a UTRAN (UMTS Terrestrial Radio Access Network), GERAN (GSM/EDGE Radio Access Network) or any future potential RAN such as IP-RAN (Internet Protocol RAN), of a cellular network, such as a UMTS (Universal Mobile Telecommunications System) network.

BACKGROUND OF THE INVENTION

Data services of the GSM (Global System for Mobile communications) have launched a new era of mobile communications. The early analog cellular modems had become unattractive to the market, as they were slow and unreliable. Now the market for data is moving onwards (more bursty) and upwards (more traffic), and the standardization institutes are working towards higher data rates but more significantly also towards packet data services. This will certainly broaden the appeal to end-users because data is routed more efficiently through the network and hence at lower costs, and also access times are reduced.

The general trend is for data applications to generate increasingly bursty data streams; this results in inefficient use of circuit switched connections. Moreover, fixed networks have seen an enormous growth in data traffic, not at least because of the rise of Internet access demand, such that it is to be supposed that mobile networks will spread as technology and customer expectations move on. The current GSM switch network is based on narrow band ISDN (Integrated Services Digital Network) circuits, so that the reason for rate limitations moves from the access network to the core network.

The new GPRS (General Packet Radio Services) network will offer operators the ability to charge by the packet, and support data transfer across a high-speed network at up to eight times slot radio interface capacity. GPRS introduces two new nodes into the GSM network, a SGSN (Serving GPRS Support Node) and a GGSN (Gateway GPRS Support Node). The SGSN keeps track of the location of the mobile terminal within its service area and sends and receives packets to/from the mobile terminal, passing them on or receiving them from the GGSN. The GGSN then converts the GSM packets into other packet protocols (e.g. IP or X.25) and sends them out into other networks.

UMTS will deliver advanced information directly to people and provide them with access to new and innovative services. It will offer mobile personalized communications to the mass market regardless of location, network or terminal used. In the basic network architecture according to 3GPP Release '99, as defined in the 3GPP technical specification TS 23 060 (Version 3.6.0, 2001-01), two or more CN (core network) domains can be connected to one RNC (radio network controller) or a similar unit, e.g. RNAS (Radio access network Access Server), in the radio access network. Moreover, a UE (user equipment) or a mobile terminal or MS (mobile station) have an independent relation to the two (or more) CN domains, i.e. separate MM (mobility management) connections, such that the two (or more) CNs are "uncoordinated".

In the two CNs, switching control is performed by circuit switched (CS) MSCs (Mobile Switching Centers) and packet switched (PS) 3G SGSNs, respectively, which have no interactions with each other. Both of them have a functionality of their own. When an MS has no CS services in use, the MSC sees its MM state "MM idle". When the MS has no PS services in use, or it has PDP (packet data protocol) contexts, but it has not shown any activity for a long time, it is in a PMM (packet mobility management) state "PMM idle" from the 3G SGSN's point of view. When the MS has an ongoing PS or CS connection, it has established an RRC (Radio Resource Control) connection towards the RNC. This means that the MS performs either handovers, cell updates or URA (UMTS Registration Area) up-dates, depending of the channels it uses and the level of activity it has shown lately. From the CNs' point of view, the MS is in the MM state "MM-connected" (via MSC) or in the PMM state "PMM-connected" (via 3G SGSN). The RNC includes both CRNC-C (Controlling RNC C-plane) and SRNC-C (Serving RNC C-plane) functionalities in the same physical entity. The CN sees RNCs mapped to LAs (location areas) in the MSC or to RAs (routing areas) in the 3G SGSN.

The MS may have only a PS connection in use. Thus, it is PMM-connected in the 3G SGSN and RRC-connected in the RNC, but the MSC sees the MS in state "MM-idle". If an incoming call arrives at the MSC, the MSC sends a paging message to all RNCs, which serve the LA the MS, has registered to. If there are several RNCs serving the same LA, paging is sent to the RNC(s) where (an) RRC connection(s) exist(s), but also to RNC(s), which do not know the MS. Thus, unnecessary extra pagings are performed.

Furthermore, the MS may have an NRT PDP (Non-Real Time Packet Data Protocol) context in use, the RAB (Radio Access Bearer) of which has been released due to low level of activity. After that, the MS establishes a CS call and enters to the MM state "RRC-connected". During the call, the 3G SGSN may receive data packets related to the NRT PDP context. The 3G SGSN then assumes that the MS is in the PMM state "PMM-idle" and sends a paging request to all RNCs, which are mapped to serve the corresponding RA. However, in one of the paged RNCs, the MS's RRC connection already exists, while all other RNCs perform unnecessary extra pagings.

Thus, signalling load on radio interface paging channels is significantly increased due to pagings from "unnecessary" cells.

SUMMARY OF THE INVENTION

It is therefore an object of the present invention to provide a paging method and system for a radio access network (RAN), by means of which the signalling load in the radio interface paging channels can be reduced.

This object is achieved by a paging system, paging method, and network-controlling device as defined in claims 1, 8 and 16, respectively.

Accordingly, the paging coordination means are arranged to receive pagings and to distribute the pagings to other network controlling devices. Thereby, the whole access network is seen as one mapping in the core network. This does not necessarily require changes to standards, but it makes configuration easier. The invention makes a forced location area update concept unnecessary in UMTS. Furthermore, the invention reduces signalling load on radio interface paging channels, since a mobile that already has an RRC connection would never be paged from "unnecessary" cells.

Future IP based radio access networks may provide a distribution of functions and a "full-mesh" IPv6 (IP Version 6) network between all base stations and controllers, which makes this kind of optimization a very attractive feature. Compared to the current UTRAN Release '99 3GPP specifications, less signalling in Iu interfaces and in (radio) paging channels (and. also in Iub interfaces) can be achieved, wherein a Iu is an interface between a RNC and a CN and a Iub is an interface between a RNC and a Node B, which is a logical node responsible for radio transmission/reception in one or more cells to/from the UE. In particular, a peculiar 'forced/prohibited' LA/RA mechanism as included in the UTRAN Release '99 specifications for mobiles in connected mode is no longer required.

The paging coordination means may have storing means for storing real time information about mobile terminals having a connection to the radio access network. Such real time information may be identification information of the mobile, e.g. the International Mobile Subscriber Identity or like. Whenever a mobile terminal connects to the radio access network, the identification information about the mobile terminal is stored in the storing means and the identification information is removed from the storing means when the connection to the radio access network of the mobile terminal is terminated.

Further, the distribution of pagings is based on a paging message provided to the paging coordination means, e.g. the paging message may include information about a location area, a routing area, a cell and/or cell resources, and a real time mapping of mobile terminals being connected to the radio access network provided by the storing means. Then, the pagings are directed to mobile terminals located within the area of the radio access network. Therefore, unnecessary pagings to network elements are avoided, e.g. cells, which are not related to the addressed mobile terminal.

Primary, the paging coordination means may be a paging server or could be implemented in a predetermined radio access network access server or a predetermined radio network controller.

When pagings are routed from packet or circuit switched core network to the paging coordination means within the paging system, the paging message is provided to the paging coordination means. Based on the paging message and the information stored by the coordination means other network controlling devices are determined to which the paging message is to be routed. Thus, the pagings are distributed from the central paging coordination means to the determined network controlling devices.

In a first embodiment determining other network controlling devices comprises checking with at least one other paging coordination function of the radio access network whether another paging coordination function has a packet or circuit switched connection to the mobile terminal addressed by the paging and then distributing the paging message to the determined other paging function based on the result of the checking step.

In a second embodiment of the present invention determining other network controlling devices includes checking based on the paging message and the information stored within the coordination function which other network controlling devices the paging message has to be routed to.

According to the first and second embodiment, while the access network comprises many RNCs and/or RNASs, the information required for paging or mobility management (MM) is provided at one place in one location area (LA) or routing area (RA). Thus, when the core network (CN) sends a paging request, the request does not have to be transmitted to many RNCs and/or RNASs and extra paging can be avoided in the access networks, e.g. in both GERAN and UTRAN. Moreover, a paging coordination is possible despite of the number of different CNs, and an opportunity is given to implement UE specific signalling in servers, which are not dependent on the areas.

In the control plane, the CN may see the access network (e.g. IP RAN) as one address, because all the pagings can be directed to one server. Hence, there is no need for area-UE specific signalling element mappings in the CN. The paging function in the access network will be centralized to one or several servers. This gives the possibility to paging coordination in different access networks (e.g. UTRAN and GERAN). In addition to this, SRNC-C's UE specific functions may be distributed to elements, which have no dependencies to any area. This also gives an opportunity to distribute the load caused by SRNC-C's UE specific functions evenly among those elements.

Further advantageous developments are defined in the dependent claims.

In the following, the present invention will be described in greater detail on the basis of two preferred embodiments with reference to the accompanying drawings, in which.

DESCRIPTION OF THE PREFERRED EMBODIMENTS

In the following, the preferred embodiments of the method and system according to the present invention will be described on the basis of a UMTS based radio access system in which independent broadband wireless access networks are introduced as alternative or additional radio access technologies for UMTS. The IP RAN is an example for an IP based RAN for providing access for UEs of multiple radio technologies to UMTS based CNs. Some examples of these radio technologies are GSM, EDGE, WCDMA, and/or WLAN. The first applications to be implemented in IP RAN are GERAN (GSM/EDGE RAN), GSM and UTRAN (UMTS Terrestrial Radio Access Network). RAN functionality will be distributed to several servers, which will be connected to an IPv6 based network.

Figure 1:
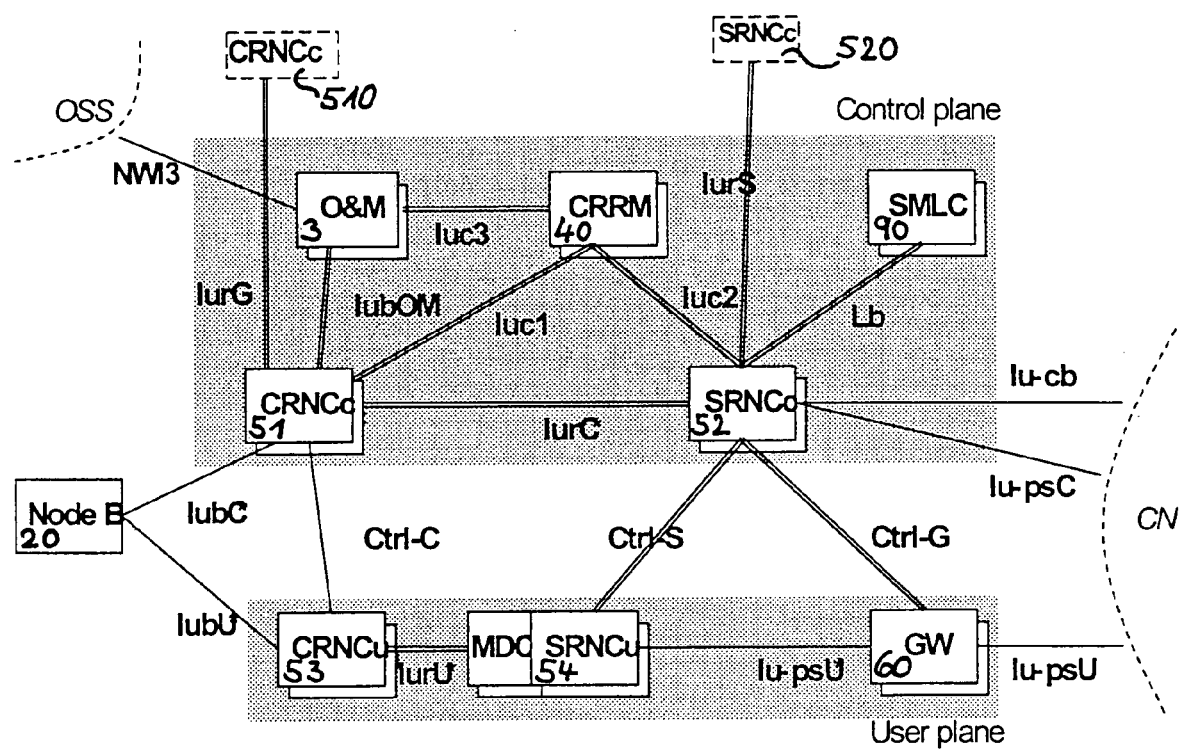
FIG. 1 shows a schematic block diagram of an IP RAN architecture in which the present invention can be implemented.

FIG. 1 shows an IP RAN architecture. According to FIG. 1, the architecture can be divided into a control plane (C-plane) functionality and a user plane (U-plane) functionality, which are both connected to a Node B 20. The Node B 20 is a logical network node responsible for transmission/reception in one or more radio cells to/from a UE or mobile terminal. Thus, the Node B 20 terminates the Iub interface towards the RNC functionality.

In the user plane, the Node B 20 is connected via an IubU interface to a U-plane Controlling Radio Network Controller CRNCu 53 which has the overall control of the logical resources of its RAN access points. The CRNCu 53 is connected via an IurU interface to a U-plane Serving RNC SRNCu 54 with an MDC (Macro Diversity Combining) function. The MDC function is an RNC related user and control plane function, which is adapted to choose the better signal from alternative ones according to quality parameters. The Iur interface is a logical interface between two RNCs. The SRNCu 54 then provides a connection via a packet switched Iu-psU interface to a gateway GW 60 which provides access to a core network CN.

The above-mentioned U-plane elements are connected via respective interfaces Ctrl-C, Ctrl-S and Ctrl-G, respectively, to a C-plane CRNC CRNCc 51 and C-plane SRNC SRNCc 52, respectively, of the C-plane functionality. The CRNCc 51 and the SRNCc 52 are connected to each other via an IurC interface.

In the C-plane, the Node B 20 is connected via an IubC interface to the CRNCc 51, and a connection to the core network CN can be established via the SRNCc 52 and an Iu-psC interface or an Iu-cb interface.

The functions of the SRNCc 52 and the CRNCc 51 can be gathered from the following tables 1 and 2, respectively.

TABLE 1

| SRNC-C functions | |
|---|---|
| UE related function | |
| RANAP (Radio Access Network Application Protocol) connection termination | |
| RRC connection management | Establishment, reconfiguration, and release or an RRC (Radio Resource Control) connection |
| RAB management | Establishment, reconfiguration, and release a RAB (Radio Access Bearer) to the UE |
| Admission Control | Bearer admission control including allocation of air interface L2 and L1 parameters, decision of radio channel request and modification QoS (Quality of Service) negotiation across the Iu interface |
| Radio Handover (HO) Control | Radio handover control including HO decision and resource reservation management Network HO control including relocation of Iu connection and L2 processing entity, or anchoring Control and processing of UE measurement Selection of the CRRM, and CRRM enquiry for HO candidate |
| Network handover control | Decision and execution of the relocation of the Iu connection Decision and control of the anchoring of the BTS (Base Transceiver Station) Decision and control of the relocation of the BTS |
| Radio Bearer management | Radio bearer control including bearer priority control Channel type selection and switching (common-dedicated) |
| Load Control | Inquiries for network balance maintenance |
| Temporary Id Control | Allocation of GRNTI |
| User plane control | Selection of the GW unit Initialisation and management of the GW connection for the UE |
| User plane control, SRNCu | Initialisation and control of the SRNC-u entity for the UE connections Receive and process quality measurement (FER, Frame Error Ratio) from the SRNC-u |
| UE Location control functions | Selection of the SMLC Enquiry to the SMLC for UE positioning |

TABLE 1-continued

| SRNC-C functions | |
|---|---|
| Common functions | |
| Paging | Execution of connected mode paging Relay of idle mode paging message to the relevant CRNC-C |
| Broadcast, Multicast service management | Relay of the Iu-CB messages to the respective CRNC-C Relay of the NAS (Network Access Server) information from Iu interface to the relevant CRNC-C entity |
| Location Measurement Units control | Relay LMU (Local Mobile Unit) control messages from SMLC to the relevant CRNC-C |
| GW Management | Management of the logical resources of the GW (Gate Way), e.g. addresses, etc. |

TABLE 2

| CRNC-C functions | |
|---|---|
| UE related handling | |
| Admission Control | Cell admission control Channel allocation (incl. DFCA) |
| Initial access | Selection of the SRNC-c |
| Cell management | Allocation/deallocation of dedicated physical radio channels |
| Load Control | Cell load and congestion control |
| Handover control | Handover algorithm, pre-processing of the handover measurements Setting the trigger of the handover measurement |
| controlling RR (Radio Resources) | cRR function for processing of UE measurement |
| Temporary Id Control | Allocation of Cell RNTI (Radio Network Temporary Identity) |
| Power Control | Open loop power control (allocation of the initial power) |
| Common | |
| Paging | Execution of Idle mode paging |
| Cell measurements | Collecting cell measurements (for CRRM) |
| common and shared channel management | Allocation/deallocation of common/shared physical radio channels Control of the CRNC-u entity |
| Broadcasting Information | Access stratum info Non access stratum info |
| Positioning | Control of the LMU |

To achieve these functions, the SRNCc 52 is connected via an Lb interface to a Serving Mobile Location Center SMLC 90 and via an Iuc2 interface to a Common Radio Resources Management CRRM 40 which is connected via a Iuc3 interface to an Operation and Maintenance O&M server 3 for controlling logical resources owned by the RNC functionality. The O&M server 3 is connected via an IubOM interface to the CRNCc 51 and provides access to an OSS (Operations Support System) via an NWI3 interface. As indicated in FIG. 1, the CRNCc 51 and the SRNCc 52 are connected to a corresponding peer CRNCc 510 and peer SRNCc 520, respectively, of the IP RAN.

Figure 2:
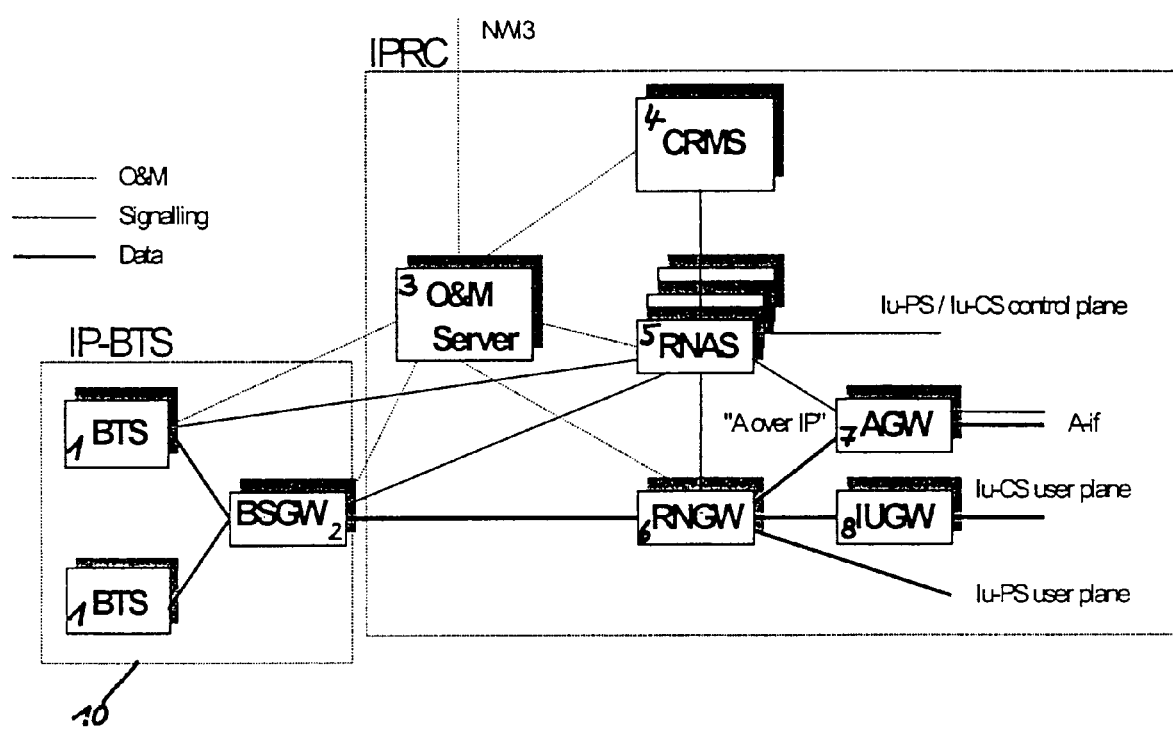
FIG. 2 shows an IPRC (IP radio controller) architecture in which the present invention can be implemented.

FIG. 2 shows an IPRC (IP Radio Controller) architecture, which may be implemented in the IP RAN. The IPRC consists of many SRNC-Cs (called RNAS 5) which are independent of any LAs, RAs or other areas, and which perform only an MS or UE specific signalling.

The IPRC comprises an O&M server 3 and an RNAS 5 which is connected via respective signalling connections to a Common Resource Management Server (CRMS) 4, to an A Interface Gateway (AGW) 7 for providing a core network access via the A Interface, to a Radio Network Gateway (RNGW) 6 which provides a data gateway functionality between an IP-BTS (IP Base Transceiver Station) 10 and a packet switched Iu-PS user plane or a circuit switched Iu-CS user plane (via an Iu Interface Gateway (IUGW) 8), to a Base Station Gateway (BSGW) 2 of the IP-BTS 10, and to a BTS 1 of the IP-BTS.

According to the present invention, the paging in the RAN is coordinated. Thus, unlike in the current architectures (GSM, UTRAN, etc.) where a LA, known by the core network, defines the cells (and radio network controllers/base station controllers or similar units), where paging message should be sent to reach a UE or mobile terminal in idle mode, in this solution, the CN needs to send the paging only to one node in the RAN and the RAN internally controls the actual paging area. This 'coordination' can be implemented in different ways as described in the first and second preferred embodiments with reference to FIG. 3 and FIGS. 4 and 5A to 5D, respectively.

Figure 3:
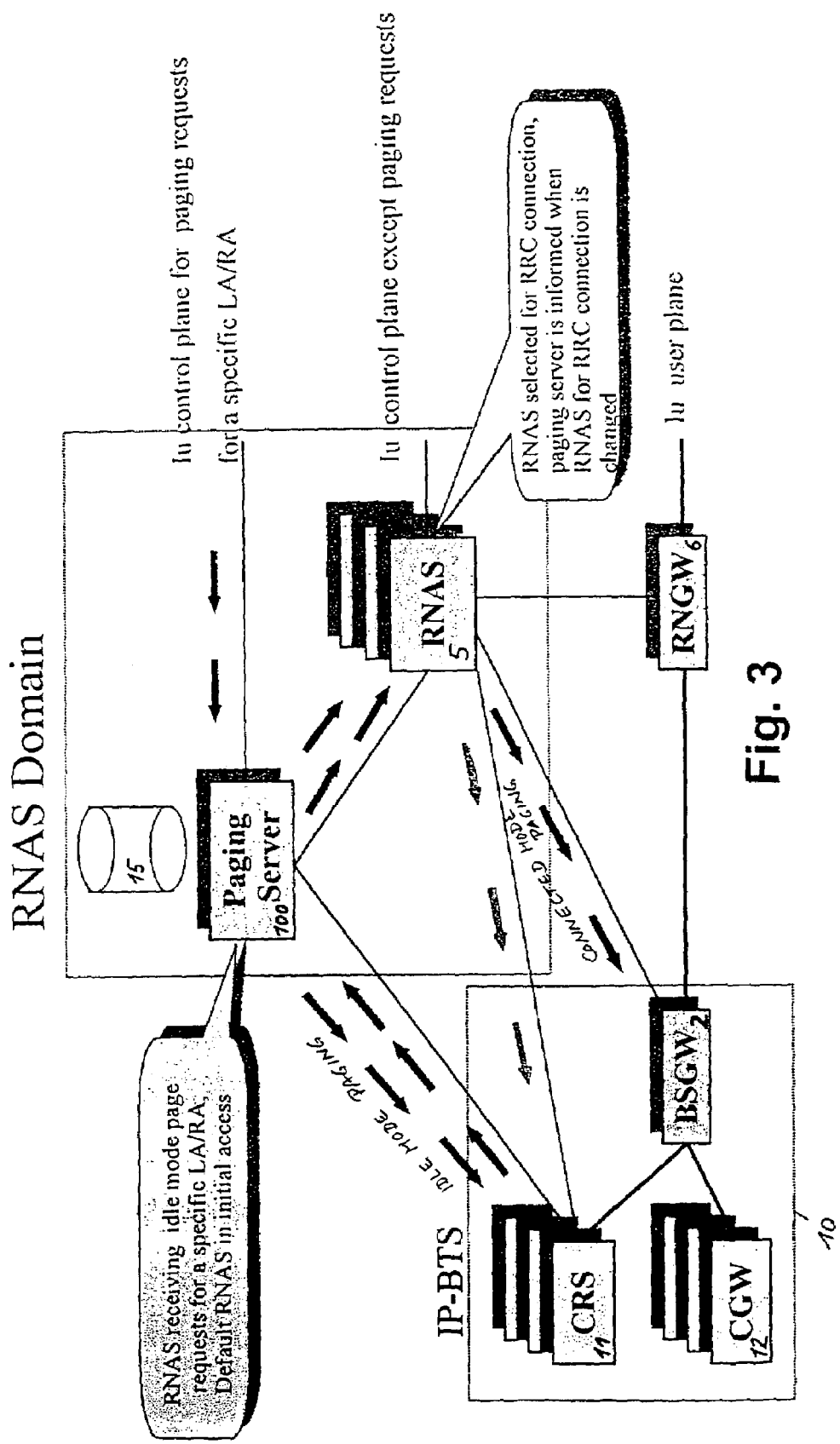
FIG. 3 shows a schematic block diagram of a RAN access server domain with a paging signalling according to a first preferred embodiment of the present invention.

FIG. 3 shows an architecture of an RNAS domain and a corresponding paging signalling according to the first preferred embodiment. According to FIG. 3, a centralized paging server 100 is provided in the RNAS domain, where all paging messages from the CNs are always routed to. This paging server 100 has real-time knowledge of all mobile terminals or UEs in "RRC connected state" within one RAN. Thus, if a paging message towards such a mobile terminal is received, the paging server 100 can forward the message to the correct BSC (Base Station Controller) or RNC or RNAS (etc.), which currently controls the connection of the concerned mobile terminal.

The paging server 100 is connected via a signalling connection to a CRS (Cell Resource Server) functionality 11 in the IP-BTS 11. This signalling connection is used in the UL (up link) direction for an RNAS selection signalling, and in the DL (down link) direction for RRC idle mode pagings. Furthermore, the paging server 100 comprises or has allocated a database 15 in which mapping information regarding e.g. IMSI (International Mobile Subscriber Identity) to RNAS address mappings and LA/RA/cell-CRS mappings and other mappings required for paging and/or mobility management purposes are stored. The paging server 100 is connected to the RNAS 5 via another signalling connection through which creations and deletions of IMSI to RNAS address associations and other mapping information can be signalled in the UL direction, and through which RRC connected mode pagings can be initiated in the DL direction. Additionally, respective signalling connections between the paging server 100 and the CN may be provided to transmit Iu-CS and/or Iu-PS and A and/or Gb interface control plane signallings and LA/RA specific paging request. Similar signalling connections may be provided for the RNAS 5 to provide corresponding control plane signalling except for paging requests. The RNAS 5 may be arranged to forward pagings in cell shared and cell dedicated states via a DL signalling connection to the Base Station Gateway BSGW 2 of the IP-BTS 10. Additionally, GERAN pagings in GRA PCH (GERAN RA Paging Channel) states and UTRAN pagings in the URA PCH (UTRAN RA Paging Channel) states may be forwarded to the CRS functionality 11 of the IP-BTS 10 via a corresponding signalling connection. Packet data can be transmitted via corresponding data connections from the CRS functionality 11 and a CGW (Cell Gateway) functionality 12 through the BSGW 2 of the IP-BTS 10 and the RNGW 6 to the Iu-PS user plane of the CN.

As regards MM signalling functions, a signalling may be performed between the BSGW 2 and the RNAS 5 to initiate cell updates, GRA/URA updates, and/or BTS anchorings and relocations. The BSGW 2 may be arranged to initiate a paging in the GERAN cell shared state and/or a paging in the ready state. Furthermore, a signalling may be performed between the RNGW 6 and the RNAS 5 to initiate paging needed notifications in the GRA PCH and URA PCH states. The RNAS 5 may be connected via respective signalling connections to other RNASs of other IPRCs to initiate RNAS relocations.

In general, an RNAS selection needs to be performed when the MS or UE moves from an idle to a connected mode, when the MS or UE performs a location registration or for idle mode paging, and in the connected mode during The selection can be performed by selecting a default RNAS for the initial access from the MS or UE and for a CN initiated idle mode paging. The default RNAS is associated with the LA/RA, and the answer for the initial access might be coming from another RNAS. In the connected mode, the RNAS can be selected based on e.g. the network topology or load. The CRMS 4 shown in FIG. 2. could be involved in the RNAS selection management.

The paging server 100 serves as an RNAS receiving idle mode paging requests for a specific LA/RA, and as a default RNAS in an initial access. As indicated by the arrows in FIG. 3, the paging server 100 receives an idle mode paging request from the CN and routes the paging request to the CRS functionality 11 of the IP-BTS 10. The CRS functionality 11 sends an initial access to the paging server 100 which routes the initial access to the allocated RNAS, e.g. the RNAS 5, based on the mapping information in the database 15. The allocated RNAS 5 issues an initial access response to the CRS functionality 1. In the connected mode, paging messages from the CN are routed by the paging server 100 to the allocated RNAS 5 which then routes the paging messages to the BSGW 2. The paging server 100 is informed by the allocated RNAS 5 when the RNAS for the RRC connection has changed.

When an MS establishes an RRC connection in an IP RAN environment according to FIG. 1, its IMSI and SRNC-C UE specific functions server identifier are stored to the database 15 at the paging server 100. The IMSI is provided to the IP RAN by the CN after security procedures have been executed. When the MS releases the RRC connection, the MS's information is removed from the database 15. The Paging server 100 has LA-RA-cell-CRNC-C address mappings stored in the database 15, to be able to forward pagings to CRNC-Cs.

When the CN sees the MS in the state "PMM-idle" or "MM-idle", it sends a paging request towards the paging server 100. The paging server 100 checks from its database 15, whether an MS's RRC connection already exists. If there is an existing RRC connection, the paging is forwarded to the corresponding SRNC-C UE specific functional element. This situation may occur, if the MS for example has an ongoing PS connection but no CS calls. If an RRC connection does not exist, the paging server 100 distributes the paging to the CRNC-Cs of the whole LA/RA.

It is to be noted that the first embodiment shown in FIG. 3 is not restricted to a single paging server 100, but there can be arranged multiple paging servers 100 with a (standard) interface between them. Moreover, the paging server 100 may be arranged as a function inside one RNAS, wherein the RNAS-RNAS interface function has to be adapted correspondingly so as to support also the paging server signalling. The database 15 of the paging server 100 can be distributed for the whole RAN (e.g. IP RAN).

According to the second preferred embodiment, the coordination functionality can be implemented as a part of a network controller, e.g. a BSC, RNC, RNAS or corresponding controller. When a network controller receives a paging message from the CN, it checks from other possible controllers whether they already have a connection for this MS or UE. This could be implemented e.g. so that CN always sends the paging message to only one controller, the message including a list of controllers (or cells) belonging to the LA/RA of the paged MS or UE. The controller receiving the paging message ("first controller") can now send a request for all the other controllers in the list and if one of them already has a connection to this MS or UE, forward the paging message from the CN to that controller. If none of the asked controllers have already a connection with the MS or UE, the first controller can coordinate the idle mode paging either by forwarding the paging message directly to all cells in the LA/RA or by requesting the other controllers to page on their cells. This selection depends on the RAN architecture, e.g. whether there is tight relation between cells and controllers or if any controller can access any cell (which may be the case in the future IP-RAN network shown in FIG. 1).

Thus, it is enough that the CN sends the paging message to one of the RNCs or RNASs together with a list of RNCs or RNASs in the respective RA or LA, and then the RNC or RNAS which received the paging message does the remaining procedures, e.g. checking whether the paged mobile terminal is active in the cover area of one of other RNCs or RNASs and, if not, executing an idle mode paging in this RA or LA (perhaps with the help of the other RNASs).

Figure 4:
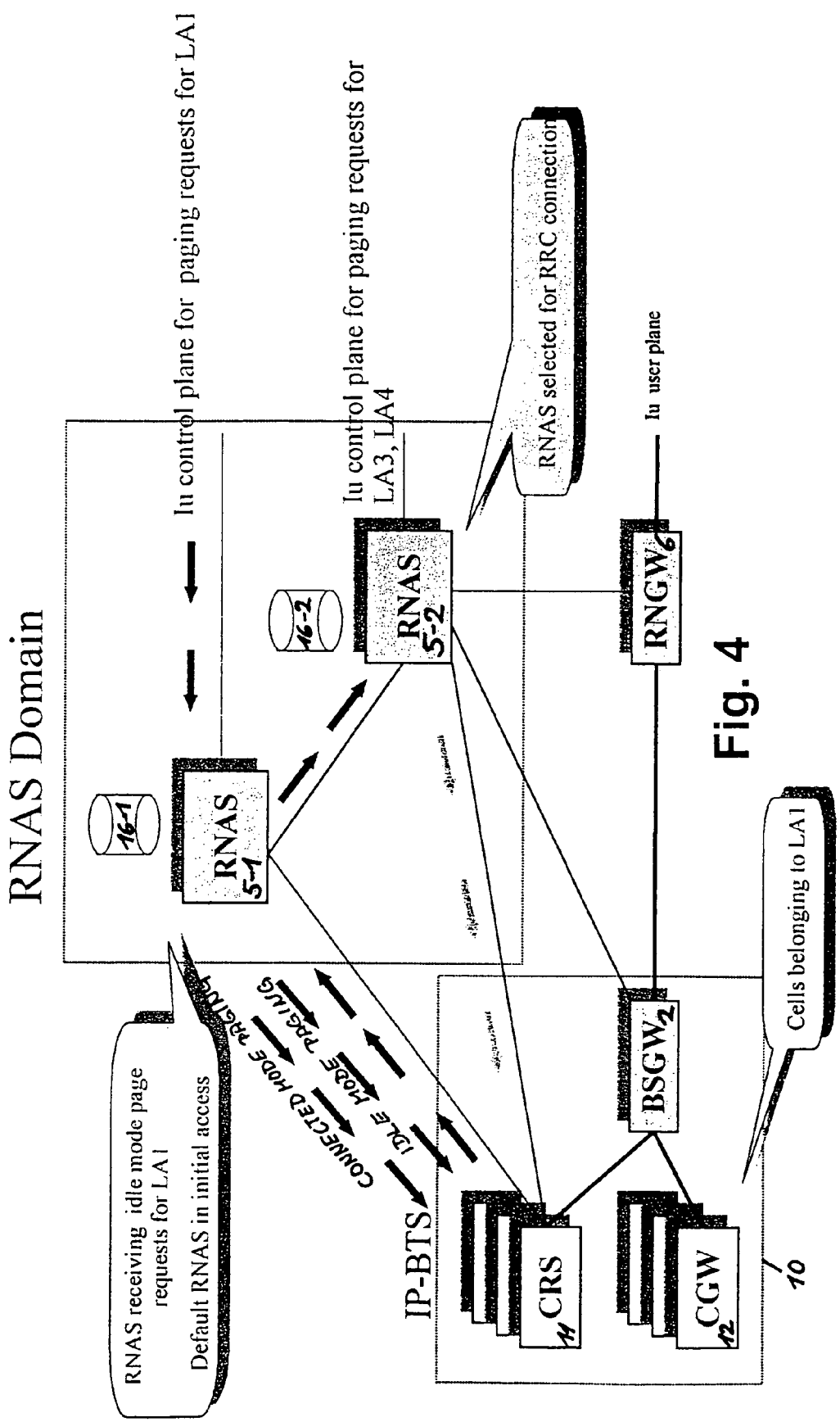
FIG. 4 shows a schematic block diagram of a RAN access server domain with a paging signalling according to a second preferred embodiment of the present invention.

FIG. 4 shows an architecture of an RNAS domain and a corresponding paging signalling according to the second preferred embodiment. The architecture corresponds to the architecture according to FIG. 3, while the paging server 100 has been replaced by a first RNAS 5-1. The function of the elements corresponding to those elements shown in FIG. 3 are similar and will therefore not be described again in this second preferred embodiment. According to FIG. 4, the first RNAS 5-1 connected to a CN via an Iu control plane for paging requests for a first location area LA1, and a second RNAS 5-2 connected to the core network via an Iu control plane for paging requests for second location areas LA3, LA4 are connected via a signalling connection. The first RNAS 5-1 has an allocated first database 16-1 and the second RNAS 5-2 has an allocated second database 16-2. In both databases 16-1, 16-2, LA/RA/cell-CRS mapping information is stored. The first RNAS 5-1 receives idle mode paging requests for the first location area LA1 and serves as a default RNAS in an initial access. The CGW functionality 12 of the IP-BTS 10 is responsible for the cells belonging to the first location area LA1.

As indicated by the arrows in FIG. 4, an idle mode paging request is issued by the CN to the default first RNAS 5-1 which routes the idle mode page request to the CRS functionality 11 of the IP-BTS 10. The CRS functionality 11 responds to the first RNAS 5-1 with an initial access message which is routed by the first RNAS 5-1 based on the mapping information of the first database 16-1 to a selected or allocated RNAS, e.g. the second RNAS 5-2. In response thereto, the second RNAS 5-2 issues a response message to the CRS functionality 11, and the RRC connection can be established. In the connected mode, pagings are also routed from the core network via the default first RNAS 5-1 to the CRS functionality 11 of the IP-BTS 10.

The access network architecture may differ from the architectures shown in FIGS. 3 and 4. In particular, the access network could be implemented without RNCs or RNASs. Then, the Iu interface is connected directly to the base station 10.

In the following, an idle paging scenario is described in an UTRAN environment with reference to FIGS. 5A to 5D, wherein a UE 17 having a connection to a first core network CN1 and being in an idle mode towards a second core network CN 2 is paged from the second core network CN 2.

Figure 5A:
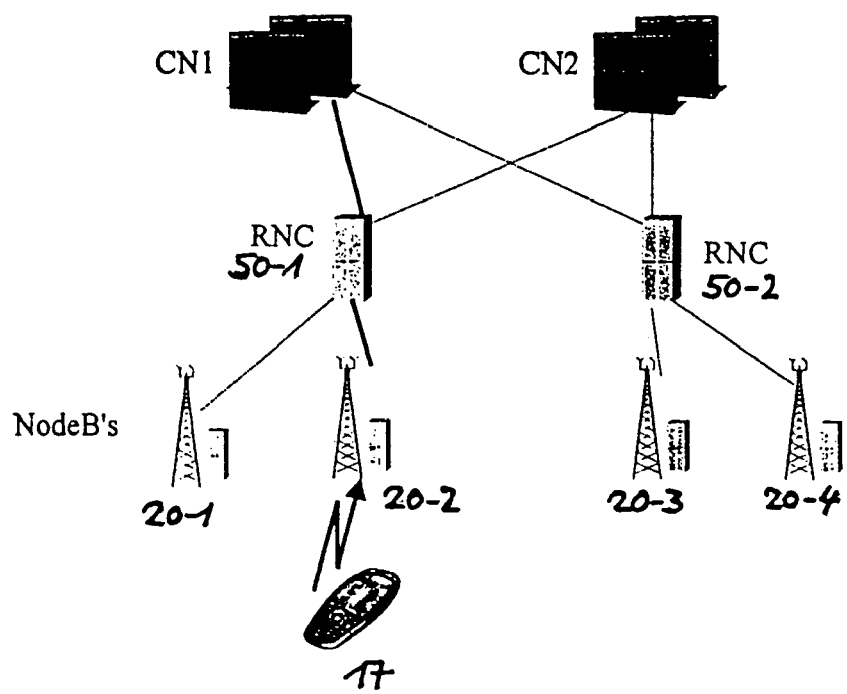
FIGS. 5A to 5D show a signalling scenario for a network initiated paging operation according to the second preferred embodiment.

According to FIG. 5A, a first and a second Node B 20-1, 20-2 having a BTS functionality in the UTRAN environment are connected via a first RNC 50-1 to the first and second core networks CN1, CN2. Similarly, a third and a fourth Node B 20-3, 20-4 also having a BTS functionality in the UTRAN environment are connected via a second RNC 50-2 to the first and second core networks CN1, CN2. In the situation shown in FIG. 5A, the UE 17 has a connection established via the second Node B 20-2 and the first RNC 50-1 to the first core network CN1.

Figure 5B:
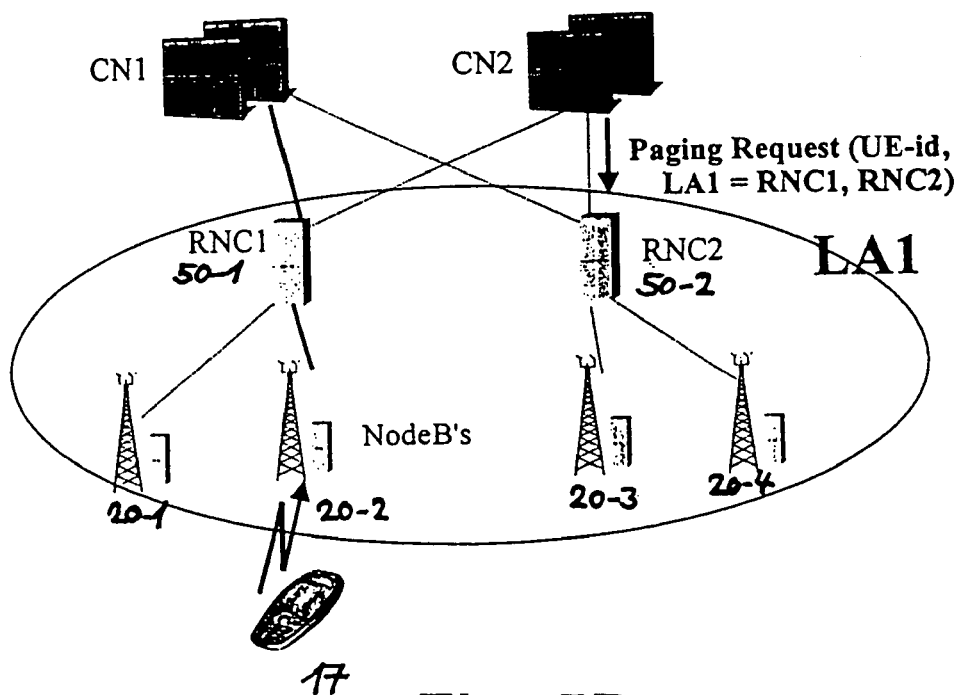

Then, as indicated in FIG. 5B, the second core network CN2 issues an idle mode paging request, including an identification UE-id of the UE 17 and an indication that the location area LA1 is covered by both the first and second RNC 50-1, 50-2. The second core network CN2 may select any RNC in the location area LA1 as a target for the paging message. It does not know that the UE 17 has an existing connection in the first RNC 50-1. In the present example, the second core network CN2 selects the second RNC 50-2.

Figure 5C:
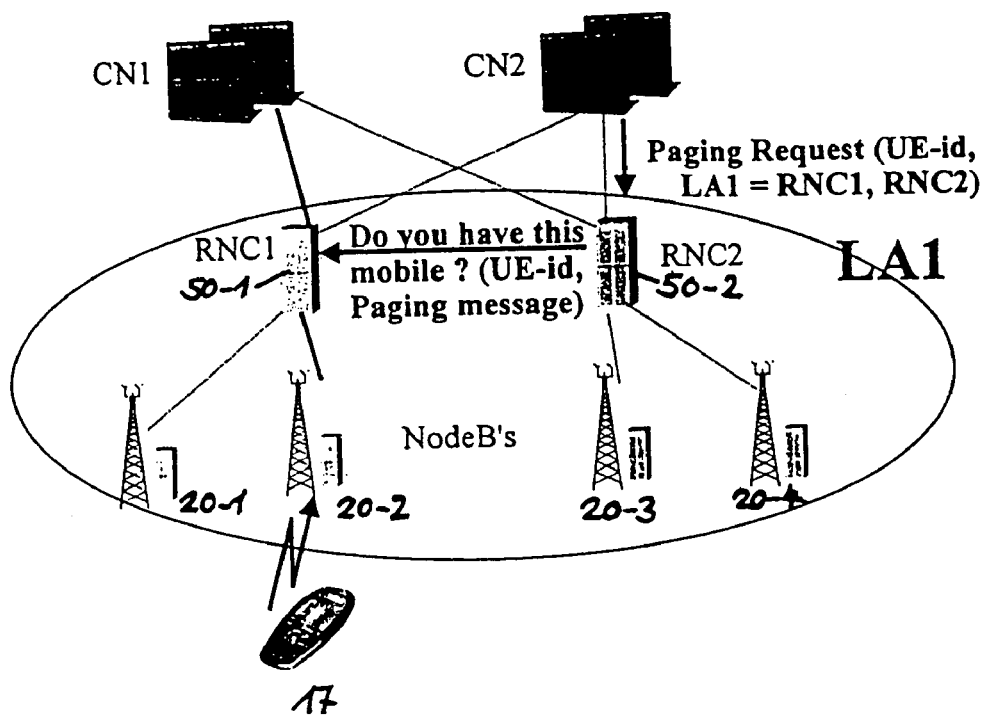
Figure 5D:
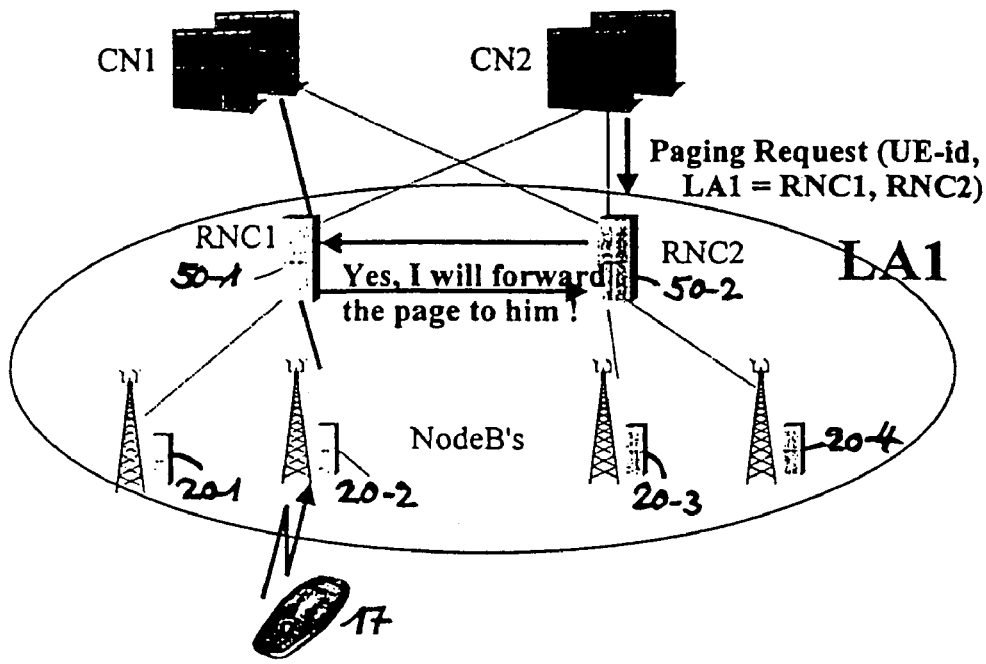

According to FIG. 5C, the selected second RNC 50-2 checks whether any other RNC in the location area LA1 has a connection established for the concerned UE 17. In particular, the second RNC 50-2 may issue a request based on a mapping information stored at the second RNC 50-2 to the concerned other RNCs asking whether the other RNCs in the location area LA1 have this UE 17 registered as connected and including the identification UE-id and the paging message. In response to this request, the first RNC 50-1 having a connection established for the concerned UE 17 answers to the second RNC 50-2 and continues the paging procedure using the existing dedicated RRC connection. As indicated in FIG. 5D, the first RNC 50-1 sends a corresponding acknowledgement ("Yes, I will forward the page to him!") to the second RNC 50-2. Thereby, unnecessary paging signallings from the second core network CN2 to the other concerned RNCs in the location area LA1 can be prevented to reduce signalling load.

It is noted that the present invention can be applied to any access network structure having a paging function for paging a terminal device from a cellular network. The description of the preferred embodiment is only intended to illustrate the present invention. The preferred embodiment may thus be modified within the scope of the attached claims.

The invention claimed is:

1. A system, comprising:
   a controller configured to receive pagings, to check for existing connections, and to distribute said pagings to other network controlling devices based on a paging message provided to said controller and on results of the checking for existing connections;
   said controller being further configured to store an identification information about a mobile terminal being connected to a radio access network in a storage unit and to remove said identification information about said mobile terminal from said storage unit when said connection to said radio access network of said mobile terminal is terminated.

2. The system according to claim 1, wherein said pagings are directed to mobile terminals located within an area of said radio access network.

3. The system according to claim 1, wherein said controller comprises or is comprised in at least one of a paging server, a predetermined radio access network access server, or a predetermined radio network controller.

4. The system according to claim 3, wherein said controller is configured to store real time information about mobile terminals having a connection to said radio access network.

5. The system according to claim 4, wherein said real time information is an identification information of said mobile terminals.

6. The system according to claim 3, wherein said identification information is an international mobile subscriber identity.

7. The system according to claim 1, wherein said paging message includes information about at least one of a location area, a routing area, a cell, or cell resources.

8. The system according to claim 1, wherein said radio access network is configured to provide access to a packet switched core network and a circuit switched core network and said controller is configured to receive pagings from both the packet switched core network and the circuit switched core network.

9. The system according to claim 1, wherein said radio access network comprises a universal mobile telecommunications system terrestrial radio access network, a global system for mobile communication enhanced data rates for global revolution radio access network, and/or other radio access networks.

10. A method, comprising:
receiving a paging message to be routed from a core network via a radio access network, at a paging coordination function;
determining other network controlling devices to which said paging message is to be routed based on said paging message and an information about existing connections obtained by said coordination function;
distributing said pagings from said paging coordination function to said other network controlling devices; and
storing an identification information about a mobile terminal being connected to said radio access network in a storage unit by said paging coordination function; and
removing said identification information about said mobile terminal from said storage unit when said connection to said radio access network of said mobile terminal is terminated.

11. The method according to claim 10, further comprising:
providing a real time mapping of mobile terminals being connected to said radio access network.

12. The method according to claim 10, wherein said information comprises an identification information of said mobile being connected to said radio access network.

13. The method according to claim 12, wherein said identification information is an international mobile subscriber identity.

14. A method, comprising:
receiving a paging message to be routed from a core network via a radio access network, at a paging coordination function;
determining other network controlling devices to which said paging message is to be routed based on said paging message and an information about existing connections obtained by said paging coordination function;
distributing said pagings from said paging coordination function to said other network controlling devices;
checking with at least one other paging coordination function of said radio access network whether another paging coordination function has a connection to said mobile terminal addressed by said paging; and
distributing said paging message to said other paging coordination function based on the result of said checking.

15. The method according to claim 10, wherein said determining comprises
checking, based on said paging message and said information stored within said coordination function, to which other network controlling devices said paging message has to be routed.

16. The method according to claim 10, wherein said radio access network provides access to a packet switched core network and a circuit switched core network, and wherein said paging coordination function receives pagings from both the packet switched core network and the circuit switched core network.

17. The method according to claim 10, wherein said radio access network comprises a universal mobile telecommunications system terrestrial radio access network, a global system for mobile communication enhanced data rates for global revolution radio access network, and/or other radio access networks.

18. An apparatus, comprising:
a receiver configured to receive a paging message directed to a mobile terminal;
a memory configured to store an information about mobile terminals being connected to said radio access network; and
a controller configured to control so as to distribute said paging message to other network controlling devices based on a checking function checking other network controlling devices having a connection to said paged mobile terminal based on said stored information,
wherein said controller is further configured to store an identification information about a mobile terminal being connected to said radio access network in said memory and to remove said identification information about said mobile terminal from said memory when said connection to said radio access network of said mobile terminal is terminated.

19. The apparatus according to claim 18, wherein said apparatus comprises or is comprised in at least one of a paging server, a radio access network access server, or a radio network controller.

20. A system, comprising:
a controller configured to receive pagings, to check for existing connections, and to distribute said pagings to other network controlling devices based on a paging message provided to said controller and on results of the checking for existing connections;
said controller being further configured to check with at least one other paging coordination function of a radio access network whether another paging coordination function has a connection to said mobile terminal addressed by said paging, and to distribute said paging message to said other paging coordination function based on the result of said checking.

21. An apparatus, comprising:
receiving means for receiving a paging message directed to a mobile terminal;
storing means for storing an information about mobile terminals being connected to a radio access network; and
paging control means for performing control so as to distribute said paging message to other network controlling devices based on a checking function checking other network controlling devices having a connection to said paged mobile terminal based on said stored information;

said paging control means being further configured to store an identification information about a mobile terminal being connected to said radio access network in said storing means and to remove said identification information about said mobile terminal from said storing means when said connection to said radio access network of said mobile terminal is terminated.

22. The method according to claim 14, wherein said determining comprises
checking, based on said paging message and said information stored within said coordination function, to which other network controlling devices said paging message has to be routed.

23. The method according to claim 14, wherein said radio access network provides access to a packet switched core network and a circuit switched core network and said paging coordination function receives pagings from both the packet switched core network and the circuit switched core network.

24. The method according to claim 14, further comprising:
configuring said radio access network to comprise a universal mobile telecommunications system terrestrial radio access network, a global system for mobile communication enhanced data rates for global revolution radio access network, and/or other radio access networks.

25. A computer-readable medium encoded with instructions that, when executed on a computer, perform a process, the process comprising:
receiving a paging message to be routed from a core network via a radio access network, at a paging coordination function;
determining other network controlling devices to which said paging message is to be routed based on said paging message and an information about existing connections obtained by said coordination function;
distributing said pagings from said paging coordination function to said other network controlling devices; and
storing an identification information about a mobile terminal being connected to said radio access network in a storage unit by said paging coordination function; and
removing said identification information about said mobile terminal from said storage unit when said connection to said radio access network of said mobile terminal is terminated.

26. The computer-readable medium according to claim 25, the process further comprising:
providing a real time mapping of mobile terminals being connected to said radio access network.

27. The computer-readable medium according to claim 25, wherein said information comprises an identification information of said mobile being connected to said radio access network.

28. The computer-readable medium according to claim 27, wherein said identification information is an international mobile subscriber identity.

29. The computer-readable medium according to claim 25, wherein said determining comprises
checking, based on said paging message and said information stored within said coordination function, to which other network controlling devices said paging message has to be routed.

* * * * *